Sept. 29, 1970   J. ASHURST   3,531,162
METERED SUPPLY OF PRESSURE FLUID FOR LONGWALL ADVANCE SYSTEM
Filed Oct. 25, 1968   8 Sheets-Sheet 1
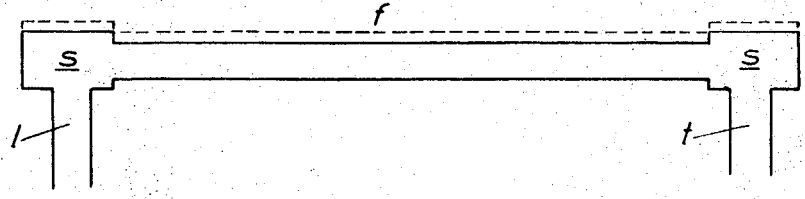
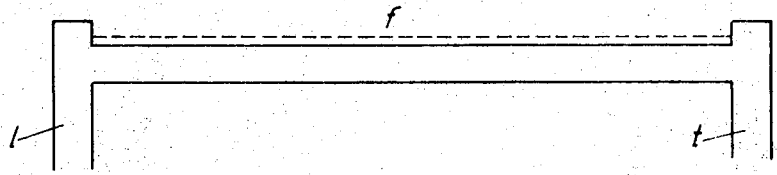
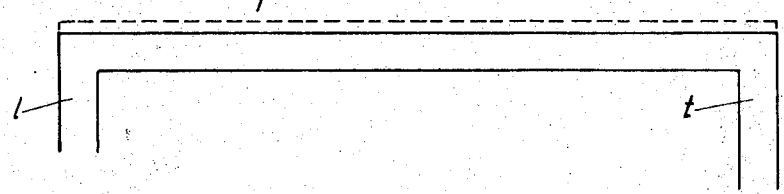
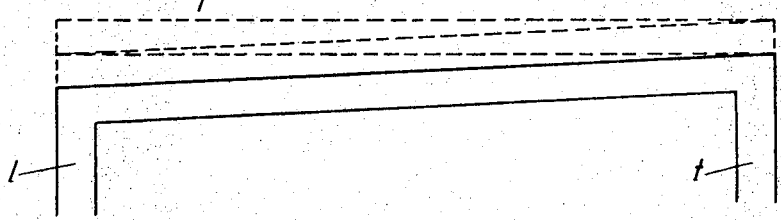
INVENTOR:
JOSEPH ASHURST

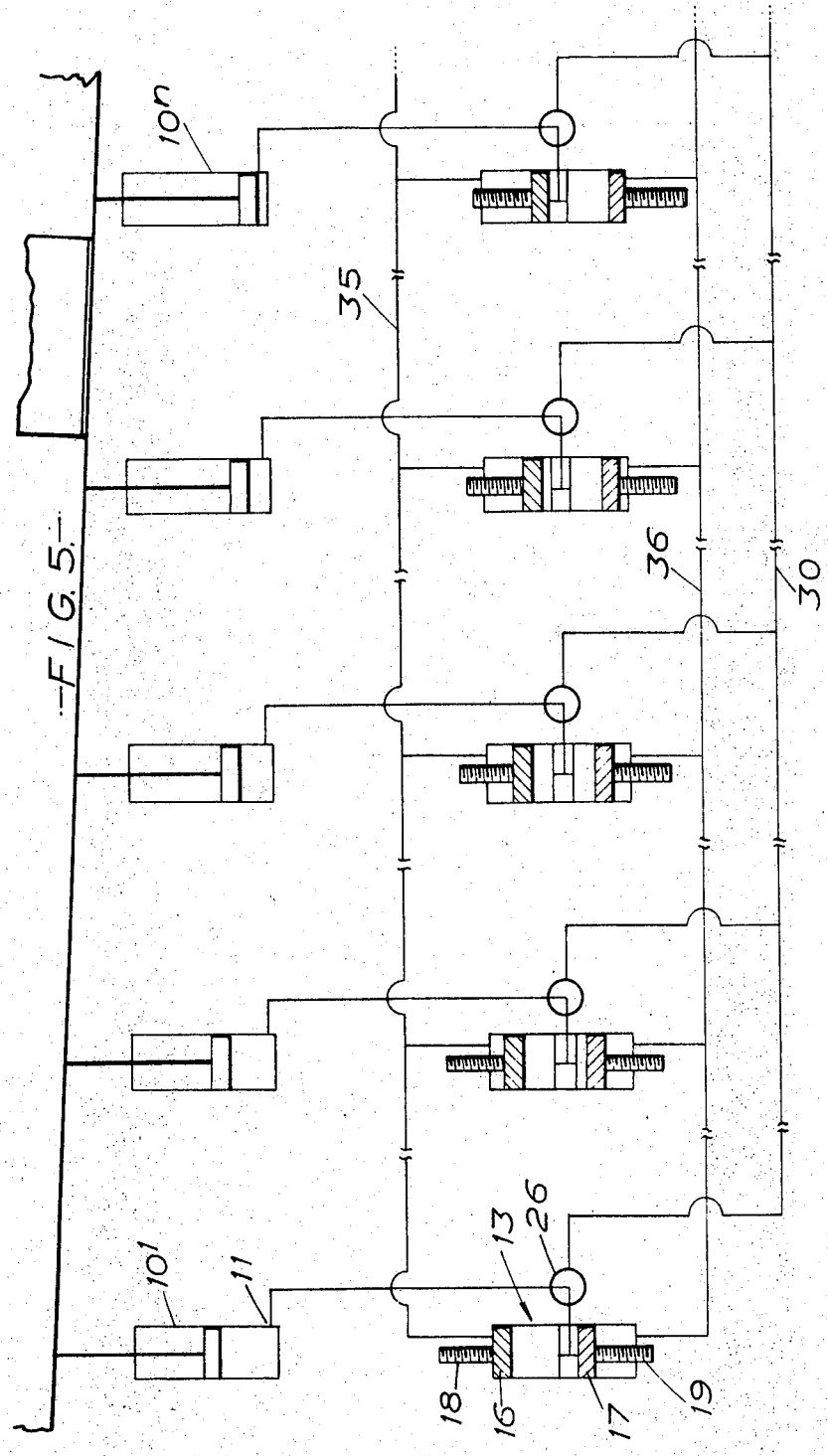

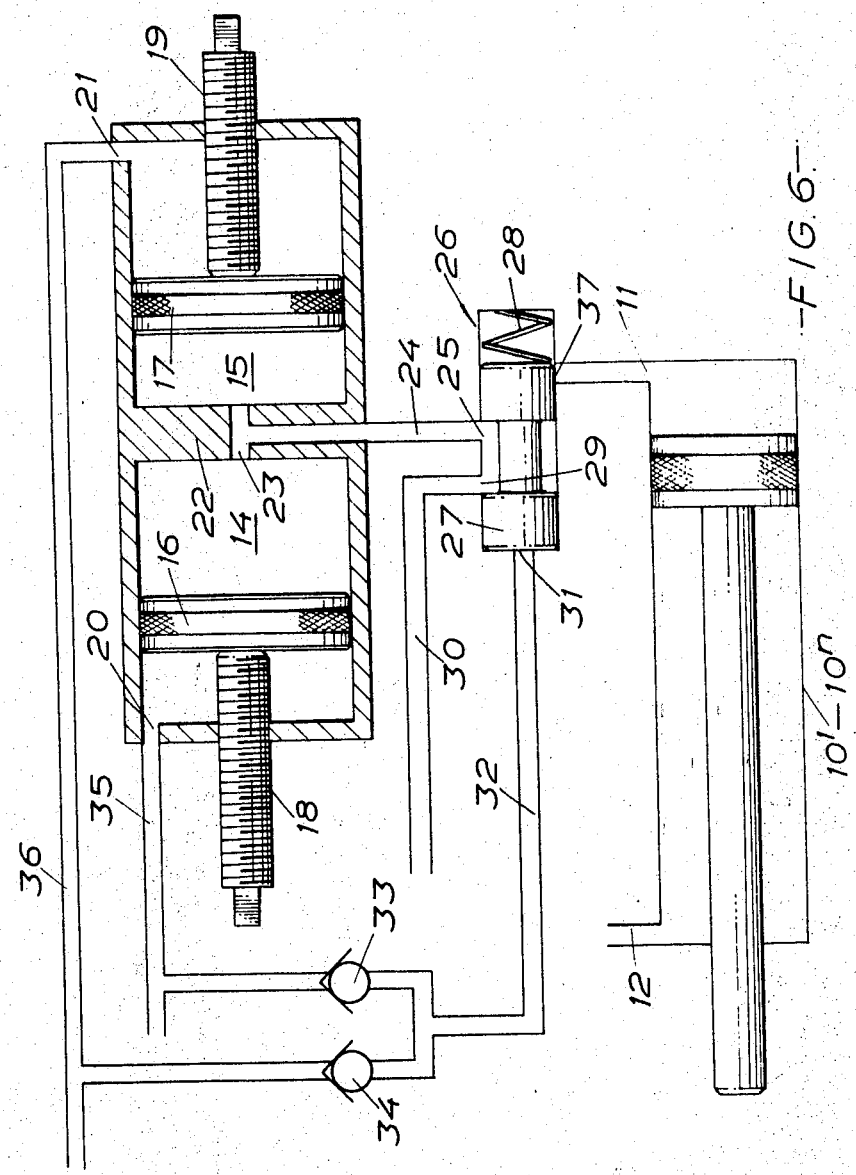

Sept. 29, 1970  J. ASHURST  3,531,162
METERED SUPPLY OF PRESSURE FLUID FOR LONGWALL ADVANCE SYSTEM
Filed Oct. 25, 1968  8 Sheets-Sheet 4
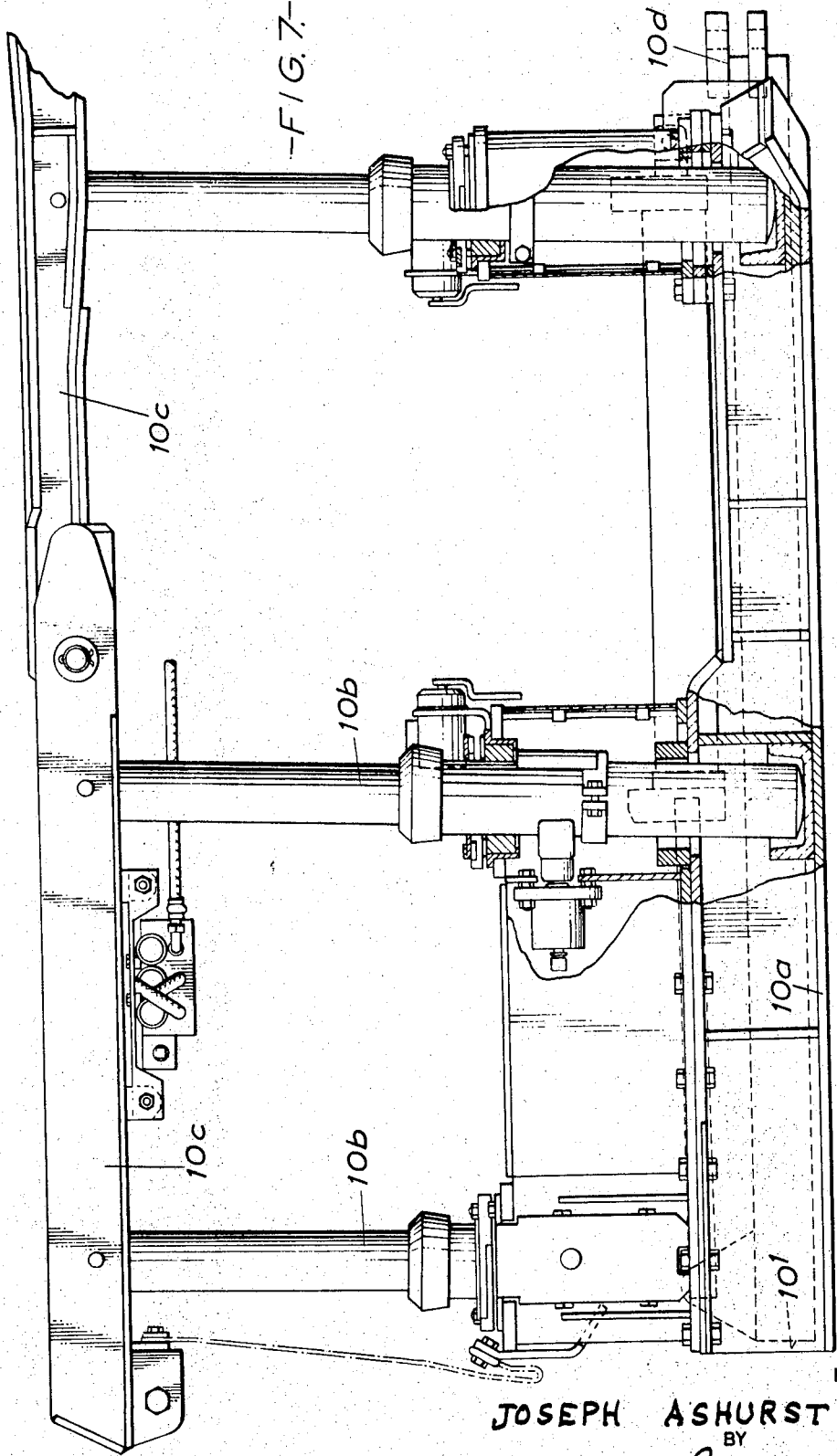
INVENTOR:
JOSEPH ASHURST
BY

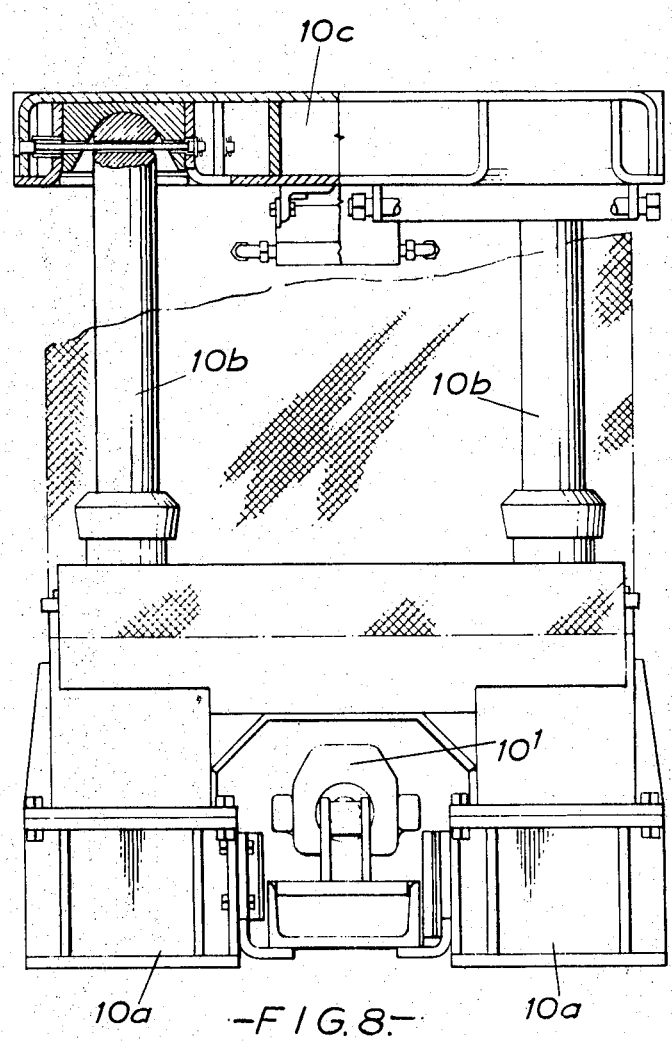

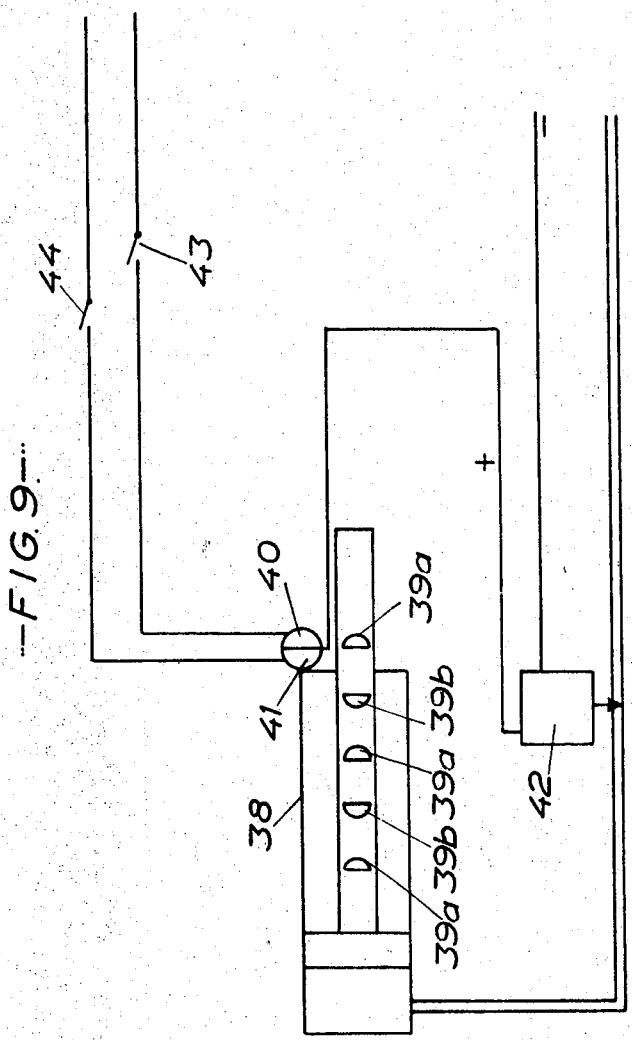

United States Patent Office 3,531,162
Patented Sept. 29, 1970

3,531,162
METERED SUPPLY OF PRESSURE FLUID FOR LONGWALL ADVANCE SYSTEM
Joseph Ashurst, Hindley, Wigan, England, assignor to Gullick Limited, Wigan, England, a British company
Filed Oct. 25, 1968, Ser. No. 770,564
Claims priority, application Great Britain, Dec. 9, 1967, 56,100/67; Jan. 4, 1968, 621/68
Int. Cl. E21c 35/14
U.S. Cl. 299—32     15 Claims

ABSTRACT OF THE DISCLOSURE

A system for controlling the pressure-fluid-operated advance of mining apparatus (e.g. a mineral cutting machine) at a mineral face, which is worked alternately in opposite directions along its length, includes metering means for dispensing pressure-fluid to advancing devices for said apparatus in amounts which are predetermined and differ according to the direction, along its length, in which the mineral face is being worked. In one arrangement the advancing devices are hydraulic rams which advance a mineral face conveyor, on which a mineral cutting machine travels, towards the mineral face obliquely or by different amounts according to the direction in which the machine is travelling along the conveyor.

---

This invention is for improvements in or relating to mineral mining systems and apparatus for use in such systems. The invention is particularly, although not exclusively applicable to longwall methods of mining.

In the longwall method of mining it is a common procedure to win or extract the mineral by means of a cutting machine, plough or other piece of apparatus which rides on the mineral face conveyor or some other guide means. The coal or mineral cutting machine or other piece of apparatus removes a web of material from the seam each time it traverses the length of the face, such material falling or being deposited in the conveyor and being conveyed thereby away from the face to the roadway. As the face advances, due to removal of successive webs of mineral, the conveyor and the roof-supporting system is advanced towards the newly exposed face.

It will be understood that when the mineral cutting machine or other winning apparatus is travelling in the same direction as the conveyor the latter is capable of taking less mined mineral than when the cutting machine is travelling in the opposite direction to the conveyor. For instance, when the cutting machine is travelling in the opposite direction to the conveyor it is possible, for example, to remove and carry away a web of material six inches thick, whereas when the cutting machine is travelling in the same direction as the conveyor it may be necessary to reduce the thickness of the web to, say, four inches.

This is best understood by considering, hypothetically, the conveyor and the cutting machine as travelling at the same speed. When they travel in the same direction the machine would then endeavour to load all the mineral onto the same flights or section of the conveyor. On the other hand when they then run in opposite directions the machine would deposit, say, one foot run of mineral face removed over a two-feet length of conveyor.

In such circumstances it is required, therefore, that prior to or when the cutting machine is travelling in one direction the amount of advance of the conveyor or other guide means for the cutting machine, should be less than when the machine is travelling in the opposite direction. One object of the present invention is to provide a mechanical system for carrying out this procedure.

In the longwall methods of mining there are a number of ways in which the mineral-bearing face is advanced. This often depends upon the type of mineral-winning device or machine. Some examples of ways in which the mineral face may be advanced are shown in FIGS. 1, 2, 3, and 4 of the accompanying drawings.

BRIEF DESCRIPTION OF THE DRAWINGS

FIG. 1 is a top schematic view illustrating a first longwall method of mining;
FIG. 2 is a view similar to FIG. 1 showing a further longwall method of mining;
FIG. 3 is a view similar to FIG. 1 illustrating still another longwall method of mining;
FIG. 4 is a view similar to FIG. 1 illustrating yet another longwall method of mining;
FIG. 5 is a schematic view of the pressure-fluid operating system of the present invention;
FIG. 6 is a somewhat schematic view partly in section showing one of the advancing means and the metering devices associated therewith;
FIG. 7 is a side elevation of one of the supports, partly broken away and in section;
FIG. 8 is a rear elevation of the structure shown in FIG. 7, being partly broken away and in section;
FIG. 9 is a schematic illustration of an electrically operated control means associated with one of the advancing devices.

In FIGS. 1–4, $f$ indicates the mineral-bearing face, $l$ the loader gate or passage in which the mined mineral is transported from the face $f$ to the surface, and $t$ the tail gate or passage in which the supplies are taken to the face $f$ from the surface.

Figure 10:
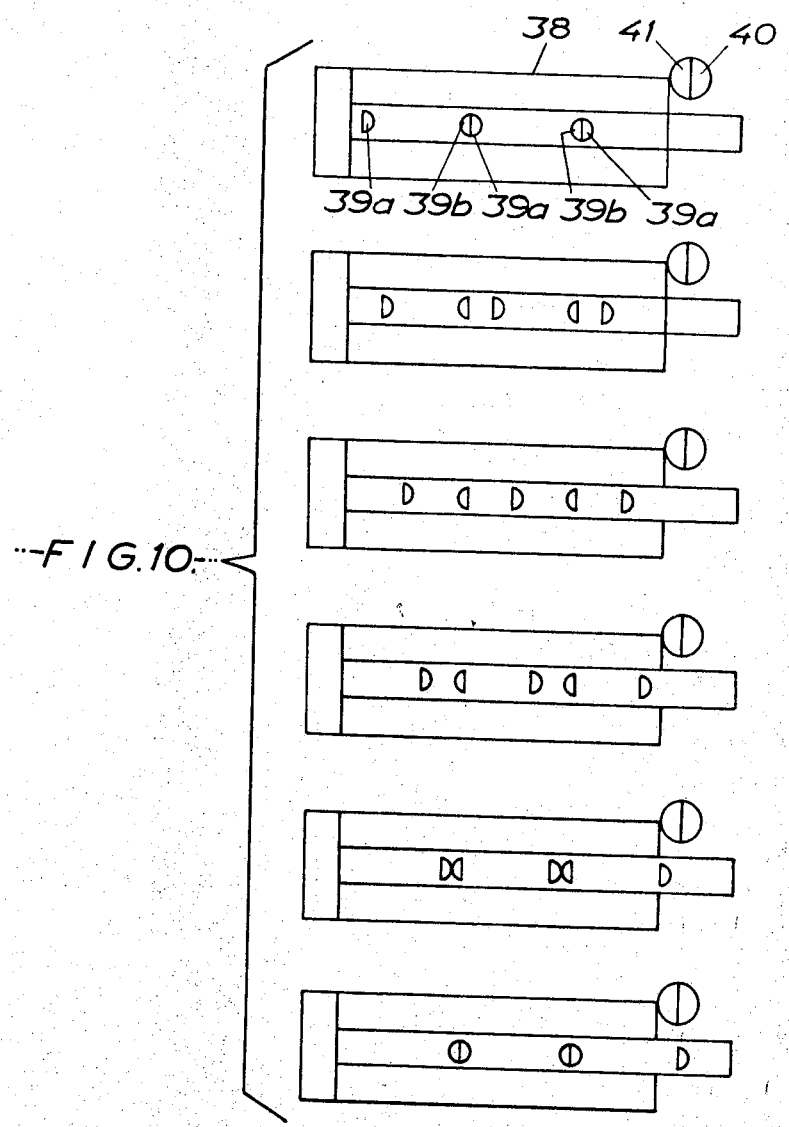
FIG. 10 illustrates the initial position of all of the rams of the advancing devices along the length of the conveyor in an electrically operated system.

In the method illustrated in FIG. 1 there is formed at each end of the face $f$ an area $s$, known as the stable, into which the mineral-winning machine, which traverses the face, may be housed temporarily whilst it is moved in the face advancing direction in preparation for the removal of a further strip or cut of mineral from the face. Such stables are necessary where the winning machine is not capable of cutting into the face except in the direction of length thereof.

FIG. 2 illustrates one method of avoiding the use of specially prepared stables by extending the gates $l$ and $t$ beyond the face. These extensions of the gates are utilised, in a similar manner to the stables referred to above, when it is required to prepare the winning machine for removal of a further strip or cut of mineral from the face. This is known as the advanced heading system.

FIG. 3 illustrates a method of face working in which no special provision is made for the machine to be advanced into the face in its non-cutting direction. Instead, the machine used is a tri-directional cutting machine which is capable of cutting into the face (i.e. sumping) preparatory to traversing the face longitudinally for the removal of a strip or cut of mineral therefrom.

Each of the methods above described with reference to FIGS. 1, 2 and 3 have disadvantages in that special preparation of the face is required or alternatively, time is spent in advancing or sumping the machine into the face. This time could be better employed in traversing the mineral-bearing face.

A method which avoids the above disadvantages is illustrated in FIG. 4. In this method a bi-directional winning machine is traversed along the mineral face, the depth of the cut alternating from zero at one end of the face to a full depth at the other. In other words, an elongated wedge of material is removed each time the machine traverses the face, the machine commencing to cut at zero depth and the depth of cut increasing progressively as the machine travels along the face.

An object of the present invention is to provide an improved system and apparatus for controlling the advance of a mineral-bearing face and its associated equipment in a zig-zag or like pattern.

According to the present invention there is provided a means of controlling the advance of a mineral-bearing face in which alternate webs of material of different thickness are removed from said face wherein measuring means are provided which alternate between a maximum or one amount when the machine is travelling or is to travel in one direction along the face, and a minimum or lesser amount when it is travelling or is to travel in the opposite direction.

According to a further feature of the present invention there is provided a mineral mining system comprising a guide means for guiding a mineral winning machine along a mineral face, a series of pressure-fluid operated advancing means spaced apart along the length of said guide means for the advancement thereof with the mineral face as winning of the mineral proceeds and means for metering pressure-fluid to the advancing means in amounts which differ according to whether the mineral winning machine is travelling or is to travel in the same direction as a face conveyor, which receives the mined mineral, or in the opposite direction thereto.

According to a still further feature of the present invention there is provided a means of controlling the advance of a mineral-bearing face in a zig-zag or modified zig-zag pattern in which measuring means are provided which alternates between maximum and zero at one end of the face and zero and maximum at the other end of the face with corresponding incremental stages between the extremes.

According to another feature of the present invention there is provided a mineral mining system comprising a guide means for guiding a mineral winning machine along a mineral face, a series of pressure-fluid-operated advancing means spaced apart along the length of said guide means for the advancement thereof with the mineral face as winning of the mineral proceeds, and means for metering pressure-fluid to the advancing means in amount which progressively increase alternately first from one end of the series and then from the other end whereby the guide means is angled towards the mineral face alternately from one end thereof and then from the other. In other words, the advance of the guide means for the mineral winning machine and of the face is in a zig-zag or modified zig-zag pattern.

Preferably the metering means is arranged so that movement of the guide means, for the mineral winning machine, alternates between maximum and zero at one end of the face and zero and maximum at the other.

Conveniently the guide means is a face conveyor for conveying away the mined mineral and on which the mineral-winning machine rides in the usual way.

The advancing means may be hydraulic rams. These, or some of them, may be embodied in self-advancing roof supports in the well known way, the arrangement being such that the rams first advance the conveyor or other guide means for the mineral-winning machine and are then operated so as to advance the supports up to said conveyor or other guide means.

One particular embodiment of the invention will now be described by way of example, with reference to FIGS. 5, 6, 7 and 8 of the accompanying drawings, FIG. 5 being a diagram of the system, FIG. 6 a diagram of one of the advancing means and metering devices therefor embodied in the system shown in FIG. 5, FIG. 7 is a side elevation of one of the supports and FIG. 8 is a rear elevation of the support shown in FIG. 7.

In the system shown in FIG. 5 the face conveyor or other guide means (not shown) for the mineral-winning machine is advanced zig-zag pattern by means of a series of double-acting hydraulic rams $10^1$, $10^2$ ... $10^n$, spaced apart along its length. Only a few of these rams are shown in FIG. 5.

The rams $10^1$ etc., may be incorporated in self-advancing roof supports in the well known way so that they serve not only to advance the conveyor but also to advance the supports. Such a support is shown in FIGS. 7 and 8, in addition to the ram $10^1$ comprises a base $10a$ and hydraulically extensible props or legs $10b$ which carry a roof engaging structure or canopy $10c$. The ram $10^1$ has a clevis $10d$ for connecting its piston to the face conveyor.

Each of the rams has a port 11 whereby it is fed with hydraulic fluid for its advancement, so as to advance the conveyor or other guide means for the winning machine, and a port 12 whereby it receives pressure-fluid for its retraction, e.g. to advance the support up to the conveyor.

Hydraulic fluid is metered differentially in predetermined amounts into the advancing rams, via their ports 11, by means of metering devices 13.

Each metering device (see more particularly FIG. 6) has two chambers 14 and 15 with respective floating pistons 16 and 17. The stroke of the piston 16 is predetermined by means of an adjusting screw 18. Similarly, the stroke of the piston 17 is predetermined by an adjusting screw 19.

A port 20 is provided in the chamber 17 for operating fluid for the piston 16. Similarly, a port 21 is provided in the chamber 15 for operating fluid for the piston 17.

Between the chambers 14 and 15 there is a wall 22 having a through-passageway or port 23. The port 23 is connected by a pipe 24 to a port 25 in a valve 26. The valve 26 has a piston or poppet 27 provided with a return spring 28. The valve 26 also has a port 29 connected by a pipe 30 to an external pressure-fluid supply source. A further port 31 of the valve 26 is connected via a pipe 32 and non-return valves 33 and 34 to operating fluid-pressure lines 35 and 36 which are also connected to the ports 20 and 21 of the chambers 14 and 15 respectively.

Finally, the valve 26 has a port 37 connected to the port 11 of the ram 10.

The system above described operates as follows:

It is to be assumed that the mineral-winning machine has just completed a traverse of the mineral face and is in the vicinity of the ram $10^1$.

It is now necessary to swing the conveyor or other guide means for the mineral-winning machine in the direction of face advance preparatory to the winning machine making a further traverse of the face in the opposite direction. In this instance angular advancement of the conveyor, as a part of the zig-zag pattern, will be about its end in the vicinity of the ram $10^1$.

Accordingly, pressure-fluid is supplied from the source (i.e. a pump), via the pipe 30 to the ports 29 of the valve 26 of the series of metering devices. Thus, the chambers 14 and 15 of each of said devices are primed (i.e. filled) via the port 25 of the valve 26, the pipe 24 and the port 23. Any resultant movement of the pistons 16 and 17 is halted by their stops 18 and 19. It should be noted that the pistons 16 and 17 occupy different positions in relation to their chambers. The system thus primed is in readiness to transfer fluid from the chambers 15 of the metering devices to their associated jacks or rams $10^1$, $10^2$, $10^3$ ... $10^n$. To achieve this pressure-fluid is supplied via the line 36 to the ports 21 of the metering devices. Simultaneously pressure-fluid passes from the line 36 via its non-return valve 34 and line 32 to each valve 26, the poppet of which is thereby moved so as to close the port 29 and connect the port 25 to the port 37 and thereby to the port 11 of the ram 10. The piston 17 then moves so as to discharge fluid from its chamber 15 to its ram 10 for the extension thereof.

It will be appreciated that the amount of extension of the ram 10 will depend upon the amount of fluid discharged from the chamber 15 and this in turn will depend upon the predetermined positioning of its piston 17 by its adjusting screw 19.

In the case of the metering device associated with the ram $10^1$ the amount of fluid fed to said ram will be zero or negligible and therefore there will be little, if any, extension of the ram or movement of the part of the conveyor with which it is associated.

Along the length of the conveyor the pistons 17 of the metering devices are set so that a progressively increasing amount of fluid is metered to their associated rams $10^2$, $10^3 \ldots 10^n$. As a result the extension of such rams will increase progressively along the length of the conveyor and the latter will be advanced by a progressively increasing amount, i.e. angularly.

When the mineral-winning machine arrives at the end of the face remote from the ram $10^1$ it is again required to advance the conveyor, this time by swinging it angularly about its said end in the vicinity of the ram $10^n$ so as to make a further step in the zig-zag pattern of face advancement. This is effected by supplying pressure-fluid via the lines 30 and 35 of the system so that fluid is metered to the rams from the chamber 14 of their metering devices. In this case the capacity of the chambers 14 between the piston 16 and the wall 22, increases progressively in the direction from the ram $10^n$ to the ram $10^1$. As a result, the ram $10^n$ receives a negligible or zero amount of fluid and the ram $10^1$ the maximum amount of fluid, the other rams receiving progressively larger amounts of fluid from their metering devices in the direction from the ram $10^n$ to the ram $10^1$.

To sum up, the sequence of fluid supply to the advancing rams or jacks is lines 30 and 36, then lines 30 and 35, then lines 30 and 36, then lines 30 and 35 and so on, which results in the required zig-zag pattern of the piston rods of the rams relative to each other and corresponding advancement of the conveyor or other guide means of the mineral-winning-machine.

Various modifications may be made in the metering or measuring device by which the predetermined differential quantities of fluid are fed to the rams along the length of the conveyor. For instance, the adjusting means 18, 19 may be interconnected so that a decrease in the effective capacity of the chamber 14 automatically brings about an increase in the effective capacity of the chamber 15 and thus maintains the ratio required. This ratio may also be maintained by making the wall 22 adjustable within the length of the metering device.

A system according to the present invention may be used for advancing a rigid conveyor on which a double-headed cutting machine having vertical rotating cutters is guided along the mineral face.

The present invention is not, however, limited in its application to a rigid conveyor or any particular type of winning machine. The system according to the invention will, for example, operate successfully with the conventional type of Panzer conveyor which may be of the snaking type (i.e. consist of a plurality of pans articulated together) and with any double-headed machine which may be a Trepanner, Shearer or even a plough.

If it should be required, to advance the conveyor by the same amount, then this can be effected by an appropriate adjustment of the metering devices.

Retraction of the jacks upon completion of their extension cycle may be effected in the usual way.

For the retraction of the rams each may have a further valve similar to the valve 26 and positioned between the ports 37 and 11. A port of this second valve, corresponding to the port 25, will be adjacent to the port 37 and a port corresponding to the port 37, will be adjacent to the port 11. Line 30 becomes the return line and the port 30 will be interconnected with the port 12. Under the action of a spring, equivalent to the spring 28, the hydraulic circuit will be open between the measuring valve 26 and the ram 10. When it is required that the arrangement should be such that the face is advanced by parallel cuts of alternately different thicknesses, instead of in zig-zag cuts, the system may be substantially identical with that described above and shown in FIGS. 5 and 6 of the drawings except that the metering devices 13, all along the face, will meter predetermined identical amounts of pressure-fluid to the ports 11 of all the rams along the face when the mineral winning machine is travelling or is to travel in the same direction as the face conveyor. Thus, the conveyor will be maintained parallel to the face. Similarly, when the mineral winning machine is travelling or is to travel in a direction opposite to that of the conveyor all the rams will receive via their ports 11 an equal and predetermined amount of pressure-fluid but the amount will be more than they receive when the machine is travelling in the same direction as the conveyor.

The system and apparatus according to the invention may utilise an electronic or electrical arrangement to achieve the objects described.

For example, the metering devices 13 may be replaced by a series of potentiometers or the like, each of said potentiometers controlling a solenoid or other valve which in turn controls the supply of pressure-fluid via their ports 11 to the rams $10^1$–$10^n$. The setting or characteristics of the potentiometers will be such that alternately they progressively open their associated solenoid valves by increasing amounts along the face so that the conveyor or other guide means for the mineral winning machine is advanced in a zig-zag pattern. Alternatively the arrangement may be such that all the solenoid valves are opened by the same amount when the machine is travelling along the face in one direction and by the same but a lesser amount when it is travelling along the face in the opposite direction.

The electrical or electronic arrangement just described may include means for sending a signal to open and a signal to close a solenoid or like valve associated with each ram. The period between the two signals will define the amount of pressure-fluid a ram receives and therefore the amount of extension and/or retraction thereof.

One particular example of such an electrical arrangement will now be described in greater detail by reference to FIGS. 9, 10 and 11 of the accompanying drawings.

Referring to these figures of the drawings, each of the conveyor advancing rams 38, one only of which is shown in FIG. 9 with its associated devices, has spaced along its piston rod for movement therewith a series of magnets 39a and 39b. Adjacent the path of movement of said magnets are two magnetically-operated reed or like switches 40 and 41, one switch being a north-pole-operated switch and the other a south-pole-operated switch. The magnets are arranged so that some (i.e. those designated 39a) present a north pole and some (those designated 39b) a south pole to the switches 40 and 41. When a like pole magnet and switch are in proximity the switch is opened.

The switches 40 and 41 control the operation of a solenoid valve 42 which controls the supply of pressure-fluid to the push side of the ram 38 when the latter is operated to advance the conveyor.

Switches 43 and 44 are provided whereby either the switch 40 or the switch 41 can be selected for operation according to the direction in which the mineral cutting machine is to move along the mineral face.

The magnets 39a and 39b are spaced and arranged differently as between the plurality of rams 38 which extend along the length of the conveyor for the advancement thereof towards the mineral face. This differential arrangement and spacing of the magnets is indicated in FIGS. 10 and 11.

Figure 11:
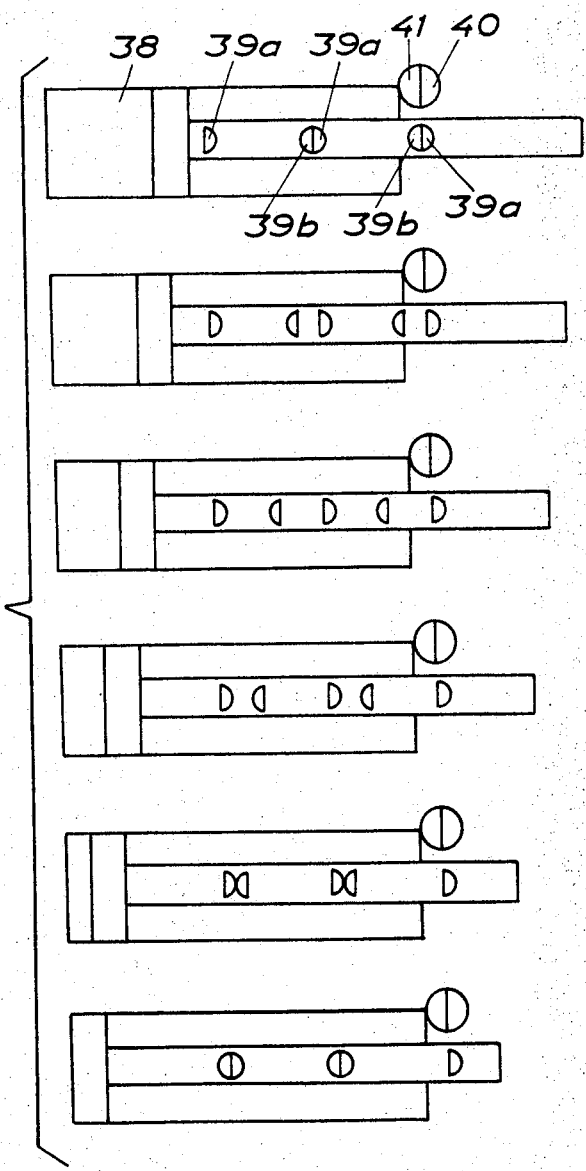
FIG. 11 illustrates the position of the rams of the advancing devices as shown in FIG. 10 after the electrically operated system is actuated whereby the rams advance different amounts to move an associated conveyor obliquely toward an associated mineral face.

FIG. 10 indicates an initial position of all the rams along the length of the conveyor, i.e. all the roof supports have been advanced and the system is ready for a further cut of the mineral face to be made by the cutting machine mounted on the conveyor.

Assuming that an oblique cut of the face is to be made, then the switch 43 is closed and a supply of pressure-fluid is made available to the rams. When each ram has advanced by a predetermined amount it will, through its first magnet 39a, operate its associated switch 40 which in turn will operate the associated solenoid valve 42 and cut off the supply of pressure-fluid to the rams. Inasmuch as the magnets 39a of the plurality of rams are spaced apart and arranged differently, each ram will advance by a greater amount than the preceding ram as shown in FIG. 11. Thus, the conveyor will be moved over towards the mineral face obliquely and an oblique or wedge-shaped cut will be made of said face.

The switch 43 is then opened and the switch 44 closed so that during the return journey of the mineral cutting machine the switches 41 will be operated, by the first magnets 39b of their associated rams 38, to cut off the supply of pressure-fluid to said rams and terminate the advance thereof when each ram has advanced by a greater amount than the preceding rams. After the rams and the conveyor have been advanced in this way (i.e. zig-zag fashion) in a plurality of steps, the magnets 39a and 39b spaced along the rams becoming operative in turn to actuate the switches 40 and 41, the rams will be retracted to the full amount of their stroke so as to advance the roof supports, with which the rams are also associated, in the usual way.

There may be several more magnets 39 on each ram than is shown on the drawings.

If the mineral is to be extracted by cuts along the face which are of one uniform thickness when the machine is travelling in one direction and of a different uniform thickness when it is travelling in the opposite direction then the magnets 39a of all the rams will be correspondingly spaced and the same will apply to the magnets 39b.

An electronic or electrical arrangement is, as above described, particularly suited to an automated roof support system under the control of punched tape or a similar medium.

I claim:

1. In a mineral mining system, apparatus extending along a mineral face which is worked alternately in opposite directions along its length, means for effecting and controlling the pressure-fluid-operated advance of said apparatus and comprising a series of pressure-fluid-operated advancing devices connected to said apparatus at intervals therealong, a pressure fluid supply, a series of metering means, each of which is operatively associated with one of said advancing devices, said metering means being connected between said advancing devices and said fluid supply, each of said metering means having pre-setting means by which it is pre-set to deliver at least two alternative predetermined quantities of pressure-fluid to the associated advancing device, the alternative predetermined quantities of pressure fluid for at least certain ones of said advancing devices being of different amounts, and means for selecting for delivery to said advancing devices either of said alternative predetermned quantities of fluid whereby the apparatus is advanced by a predetermined amount when the mineral face is being worked in one direction along its length and by a different predetermined amount when said face is being worked in the opposite direction.

2. A system as claimed in claim 1 wherein the metering means are pre-set to dispense pressure-fluid, to the apparatus advancing devices which are spaced apart along the mineral face, in amounts which are uniform along the length of the face but are less when the face is being worked in one direction than when the face is being worked in the opposite direction.

3. A system as claimed in claim 1 wherein the metering means are pre-set to dispense pressure-fluid to the apparatus advancing devices, which are spaced apart along the mineral face, in amounts which progressively increase along the face in the direction of length thereof.

4. A system as claimed in claim 3 wherein the progressive increase of the amount of pressure-fluid dispensed to the apparatus advancing devices is by equal amounts.

5. A system as claimed in claim 1 wherein said apparatus includes a guide means, for guiding a mineral winning machine, extending along the mineral face, there being a series of said pressure-fluid-operated advancing devices spaced apart along the length of said guide means for the advancement thereof.

6. A system as claimed in claim 5 wherein said guide means for a mineral winning machine is on a mineral face conveyor which receives the mined mineral.

7. A system as claimed in claim 1 wherein the metering means for the pressure-fluid-operated advancing devices are pre-set so that a series of said advancing devices, spaced apart along the mineral face, receive pressure-fluid in amounts which progressively increase alternately first from one end of the series and then from the other end whereby the mineral face is advanced in a somewhat zig-zag pattern.

8. A system as claimed in claim 1 wherein the metering means are pre-set to dispense pressure-fluid to said apparatus advancing devices in amounts which are predetermined and differ from device to device in a direction along the mineral face.

9. A system as claimed in claim 1 wherein the apparatus advancing devices are pressure-fluid rams embodied in self-advancing mine roof supports.

10. A system as claimed in claim 1 wherein each metering means comprises two chambers with respective pistons working in said chambers and means for predetermining the stroke of each piston and thereby the amount of pressure-fluid dispensed from its associated chamber.

11. A system as claimed in claim 10 wherein the pistons of the metering means are operated by pressure-fluid to dispense pressure-fluid to the advancing devices.

12. A system as claimed in claim 11 wherein control of said pressure-fluid to the pistons of the metering means for the operation thereof and the dispensing of pressure-fluid to the apparatus advancing devices is controlled by a pressure-fluid-operated valve.

13. A system as claimed in claim 10 wherein the means for predetermining the stroke of each piston and thereby the amount of pressure-fluid dispensed by the metering means are adjustable and are interconnected so that an adjustment to decrease the amount of pressure-fluid dispensed from one chamber automatically brings about an increase in the amount of pressure-fluid dispensed from the other chamber.

14. A system as claimed in claim 1 wherein the apparatus advancing devices are pressure-fluid rams and the dispensing of pressure-fluid to said rams thereby the stroke thereof is governed by the metering means, each metering means comprising an electro-magnetic valve under the control of two switches actuated by magnets, operation of the rams resulting in relative movement between said switches and magnets and operation of the switches when the rams have made a predetermined stroke.

15. A system as claimed in claim 14 and including switch means for selecting for operation one or the other of the two magnet-operated switches associated with each ram.

References Cited

UNITED STATES PATENTS 3,421,795  1/1969  Heyer et al. _____ 299—32

FOREIGN PATENTS 819,234  10/1951  Germany.
1,108,014  3/1968  Great Britain.

ERNEST R. PURSER, Primary Examiner

U.S. Cl. X.R.

61—45.2